US007566267B2

(12) United States Patent
Vancura

(10) Patent No.: US 7,566,267 B2
(45) Date of Patent: *Jul. 28, 2009

(54) METHOD FOR CASINO GAME

(75) Inventor: Olaf Vancura, Las Vegas, NV (US)

(73) Assignee: IGT, Reno, NV (US)

( * ) Notice: Subject to any disclaimer, the term of this patent is extended or adjusted under 35 U.S.C. 154(b) by 954 days.

This patent is subject to a terminal disclaimer.

(21) Appl. No.: 11/002,384

(22) Filed: Dec. 2, 2004

(65) Prior Publication Data

US 2005/0096115 A1 May 5, 2005

Related U.S. Application Data

(63) Continuation of application No. 10/434,807, filed on May 8, 2003, now Pat. No. 6,843,721, which is a continuation of application No. 09/908,658, filed on Jul. 18, 2001, now Pat. No. 6,561,899.

(51) Int. Cl.
*G06F 17/00* (2006.01)
*G06F 19/00* (2006.01)

(52) U.S. Cl. ............................ 463/16; 463/20; 463/21; 463/31; 273/138.1; 273/139

(58) Field of Classification Search .................. 463/16, 463/20, 21, 31; 273/138.1, 139
See application file for complete search history.

(56) References Cited

U.S. PATENT DOCUMENTS

| | | | | |
|---|---|---|---|---|
| 5,944,314 | A | 8/1999 | Stavinsky | |
| 6,047,963 | A * | 4/2000 | Pierce et al. | 273/121 B |
| 6,089,976 | A * | 7/2000 | Schneider et al. | 463/16 |
| 6,102,798 | A * | 8/2000 | Bennett | 463/16 |
| 6,155,925 | A | 12/2000 | Giobbi et al. | |
| 6,159,097 | A | 12/2000 | Gura | |
| 6,159,098 | A * | 12/2000 | Slomiany et al. | 463/25 |
| 6,164,652 | A | 12/2000 | Lauretta et al. | |
| 6,210,277 | B1 | 4/2001 | Stefan | |
| 6,315,664 | B1 | 11/2001 | Baerlocher et al. | |
| 6,398,644 | B1 | 6/2002 | Perrie et al. | |
| 6,409,172 | B1 | 6/2002 | Vancura | |
| 6,425,824 | B1 | 7/2002 | Baerlocher et al. | |
| 6,592,457 | B1 * | 7/2003 | Frohm et al. | 463/16 |
| 6,602,136 | B1 * | 8/2003 | Baerlocher et al. | 463/16 |
| 6,645,071 | B2 | 11/2003 | Perrie et al. | |
| 6,648,759 | B2 | 11/2003 | Vancura | |
| 6,676,516 | B2 | 1/2004 | Baerlocher et al. | |

(Continued)

FOREIGN PATENT DOCUMENTS

EP 0 945 837 A2 9/1999

(Continued)

*Primary Examiner*—Peter DungBa Vo
*Assistant Examiner*—Milap Shah
(74) *Attorney, Agent, or Firm*—K&L Gates LLP

(57) ABSTRACT

A method of playing a casino game by offering a player a plurality of objects, each of which has a probability of success and associated award. The player chooses an object and receives the associated award when the chosen object is successful. The player continues to chose objects until the casino game ends. Ending may occur randomly after each object is chosen, upon all chosen objects resulting in a success, or upon the player choosing a fixed number of objects.

15 Claims, 1 Drawing Sheet

U.S. PATENT DOCUMENTS

| | | | |
|---|---|---|---|
| 6,783,457 | B2 | 8/2004 | Hughs-Baird et al. |
| 7,112,137 | B2 | 9/2006 | Baerlocher et al. |
| 2003/0040358 | A1 | 2/2003 | Rothkranz et al. |
| 2005/0059455 | A1 | 3/2005 | Gerrard et al. |

FOREIGN PATENT DOCUMENTS

| | | |
|---|---|---|
| GB | 2353128 | 3/2009 |

* cited by examiner

METHOD FOR CASINO GAME

RELATED APPLICATIONS

This application is a continuation of U.S. patent application Ser. No. 10/434,807 filed May 8, 2003 now U.S. Pat. No. 6,843,721 which is a continuation U.S. patent application Ser. No. 09/908,658 filed Jul. 18, 2001, now U.S. Pat. No. 6,561,899 issued May 13, 2003.

BACKGROUND OF THE INVENTION

The present invention relates to casino games and, in particular, to casino bonus games giving a player chances to make selections as part of the bonus game play.

Bonus games on casino slot machines have become very popular. To play a bonus game, a player typically must qualify by aligning several special symbols on the underlying traditional game. Play then switches over to a bonus game (either in a separate apparatus or a separate screen, e.g.), in which the player participates without additional wager but typically with an award at its conclusion. The amount of the bonus award is determined during and by bonus play.

Among bonus games, those in which the player chooses from among a plurality of objects are common.

For example, the games, Reel 'Em In! and Filthy Rich by WMS Gaming contain bonuses in which the player is presented with 5 objects (e.g., fishermen, pigs) and chooses one of them to reveal an award. The game Sphinx by Atronic also affords the player a choice of 5 objects, four of which reveal an immediate award, and one of which advances the player to an additional choice of 5 objects comprising larger awards.

The games American Pride by CDS (U.S. Pat. No. 6,089,976) and Pick 'N Pop by Anchor contain bonuses in which the player is presented with a predetermined number of objects (e.g., stars, balloons), each of which has an associated award. The player chooses until matching two awards; the matching award is then given to the player. The game The Munsters by IGT contains a bonus in which the player is presented with a predetermined number of objects, each of which has an associated award. The player chooses until matching three awards, which is then given to the player.

The games Jackpot Party and Monopoly Chairman of the Board by WMS Gaming (European Patent Application EP 0945837A2) contain a bonus in which the player is presented with a predetermined number of objects (e.g., boxes, cards) and chooses until selecting an "end of game" object (e.g., Go to Jail). Additionally, some objects (e.g., Get Out of Jail Free) may grant the player a nullification of a future "end of game" choice. The game Scrabble by WMS Gaming has a bonus in which the player chooses from various objects, until finding three "end of game" objects. Some objects grant the player a nullification of an "end of game" object.

The game Who Dunnit? By WMS Gaming (U.S. Pat. No. 6,159,097) has a bonus game in which the player makes choices (e.g., suspects) until finding a desired choice (e.g., the guilty suspect), with successively lower awards depending on how many choices are required to make the desired choice.

The game Sphinx by Atronic contains a bonus in which the player chooses from among five objects. Four of the objects have awards, and the fifth advances the player to another set of five objects, all of which have enhanced awards.

The game Battleship All Aboard by Mikohn, the assignee of the present disclosure, has a bonus in which the player chooses from among five objects (e.g., flags), four of which have awards, and one of which advances the player to a different bonus game.

While the current state of bonus play suggests a variety of bonus games with choices, they share in common that each choice results in an action. That is, each choice has something occur. It would be desirable to create a game in which a player choice of an object was sometimes successful and sometimes not successful. It would also be desirable to assign to each object a probability of success and associated award, in order that the player might weight the risk to reward ratio of each object and choose objects based on risk tolerance. In such a way, considerable anticipation is created in not knowing if a choice will be successful or not.

It is also desirable to create a game in which the ending of the game was not fixed, but rather, after each player choice, the game has a chance of ending. In such a manner, considerable suspense is created as the player never knows how long the game will continue to last.

SOLUTION TO THE PROBLEM

The solution as presented herein comprises a game wherein a probability of success is assigned to each of a set of objects. The probability of success is preferably related to the possible award associated with the object. In this manner, the overall house advantage may be calculated and maintained viable for the casino regardless of a player's skill or risk propensity. Too, after each player choice, the game has a chance of ending.

It is feature that the casino game disclosed herein retains, if desired, a constant house advantage while accommodating players of various risk propensity. It is another feature that the house advantage of the casino game disclosed herein, if desired, is limited to a known range. As such, the game accommodates a range of styles of play, and players may select a course of action that is more or less "risky" depending on player-preference.

It is a further advantage that the casino game disclosed herein has multiple ways for the player to select awards.

It is a further advantage that the player of a casino game as disclosed herein does not know when the game will end. The length of the game may be controlled by the chance of ending the game after each player choice.

DETAILED DESCRIPTION

Figure 1:
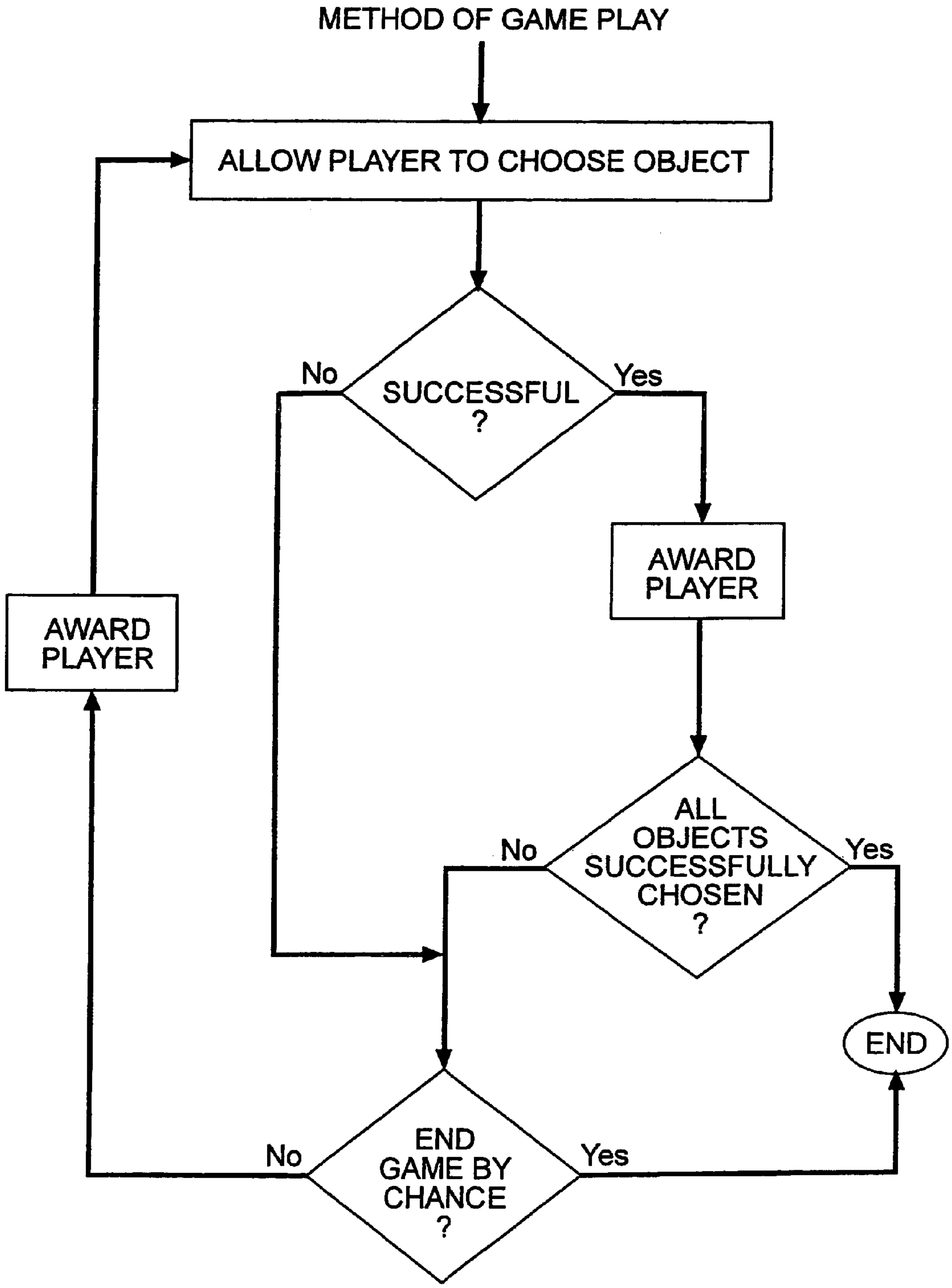
FIG. 1 is a flow diagram of a method of play disclosed for a casino bonus game having choices.

In a preferred embodiment of the bonus game, the player is presented with five choices of objects that might appear on a video screen. The choices and awards are as follows:

| Object | Probability of Success | Associated Award |
|---|---|---|
| 1 | 90% | 15× |
| 2 | 75% | 18× |
| 3 | 54% | 25× |
| 4 | 50% | 27× |
| 5 | 45% | 30× |

Each object can be an article, item, symbol, thing, place, representation of something or like depicted preferably for example, on a video screen as part of the casino or bonus game. The awards (e.g., 15×) represent multipliers to be multiplied by the player's bet. In a preferred embodiment, the award for failure to make the proper choice is nothing.

With the construction as presented, regardless of the player's choice of object, the expected value (EV) is equal to 13.5×. That is, the EV of choosing object 1 is 0.9×15=13.5, but this is also the EV of objects 2 through 5. Once it is understood that the EV of choosing any object is identical, it is straightforward to appreciate that the EV for the entire game (consisting of, e.g., a set or finite number of object choices, or other limiting means) is also identical regardless of the order in which the objects are chosen.

Should the player be successful with all objects, an additional bonus award may be given. This may simply be an additional multiplier, or may instead comprise an additional game. Thus, one manner in which the game may end is simply the player successfully choosing all objects.

The game may also end without the player successfully choosing all objects. In this case, the player may be given a fixed number of choices, e.g. six. That is to say, the player gets six choices of more than six objects, the game ending either if the player successfully chooses all 5 objects having value or runs out of choices. However, other limiting means are possible. For example, after every player choice, there may be a chance the game will end. In a preferred embodiment, this chance is 18%. That is to say, wherein there is no fixed limit to the number of choices the player receives, but after each such choice, there is an 18% chance the game will end. In another embodiment, the chance the game may end may vary as a function of the number of player's choices. For example, after the first player's choice, the chance of ending the game may be 15%. After the second choice, the chance may be 16%, and so forth, rising 1% for each player's choice.

Outlined in general terms, the game may also be played with the player receiving a lesser award for failure. Thus, for example, the choice of object 1 may result in a high award if successful or a low award if unsuccessful. Too, in the most preferred embodiment, choosing an object that results in failure leaves the object intact. However, in a different embodiment, choosing an object may cause the object to expire, hence not be available to be chosen again later in the game. Describing a preferred delivery mechanism of the preferred embodiment shown in the table that follows this paragraph. The five objects represent enemy vessels, for example a carrier, battleship, destroyer, submarine, and patrol boat. The player chooses which enemy vessel to have the game automatically fire upon from the player's boat. The probability of success represents the chance of sinking the vessel that is fired upon, with an associated award for doing so. Of course, missing the enemy vessel fired upon leaves it intact.

| Enemy ship | Probability of sinking | Associated Award |
|---|---|---|
| Carrier | 90% | 15× |
| Battleship | 75% | 18× |
| Destroyer | 54% | 25× |
| Submarine | 50% | 27× |
| Patrol boat | 45% | 30× |

After every player shot, one of the remaining enemy vessels (if any) fires back upon the player, with an 18% chance of sinking the player's own boat, thus ending the bonus game. If the enemy shot misses, the player is awarded a "survival bonus" of 7×, then the player again has the opportunity to choose an enemy vessel to fire upon. The game thus continues in that "back and forth"volley or manner until either (1) the player sinks all of the enemy ships, or (2) the player's boat is sunk.

What has been described is a game with potential multiple decisions on the part of the player. However, each decision has the same expected value. Hence, regardless of strategy adopted by the player, the entire bonus game has the same expected value. Furthermore, expected return of the entire game, hence house advantage, is identical regardless of the strategy adopted by the player.

This has the benefit of variety by being able to accommodate or permit different styles of play. For example, the risk-averse player may start by firing upon the Carrier, with a high probability of success albeit for a lesser award. On the other hand, a "gambler" may instead begin by firing upon the patrol boat, with a low probability of success but hoping for a large award.

Considering the total game as the sum of contributions from the base game plus bonus game, we may portray the total expected return (ERtotal) as follows:

$$ER\text{total}=ER\text{base}+ER\text{bonus}$$

Here ERbonus=f×EVbonus, where f is the frequency of the bonus game. The house advantage is defined as 1−ERtotal.

As an example, we may have a game with ERbase=0.6, f=0.002, and EVbonus=150. In this case, ERtotal=0.6+0.002×150=0.9, or 90% such that the house advantage is 10%.

What is important to note is that from the casino operator's point of view the performance of a slot machine having this interactive casino game has a set and calculable house advantage. Hence, a bonus game can be constructed wherein if the multiple player strategies do not have an identical expected value, and yet the total expected return remains within well-defined bounds.

As an example, if ERbase=0.6 and f=0.002, we may construct a bonus game in which the optimal EVbonus=165 and the worst-case EVbonus=150. This yields a range of ERtotal (worst-case)=0.9 and ERtotal(optimal)=0.93. Thus, it yields a house advantage in a well-defined, and calculable range, of 7% to 10%, regardless of the strategy used by the player. It is a further advantage of this invention that the overall house advantage may be limited to a well-defined, and calculable, range even if the EV for the bonus game is a function of the strategy adopted by the player.

While a particular example has been disclosed, skilled artisans will appreciate that many variations to the playing and awarding can be made without departing from the casino bonus game. Variations in the themes applied to the casino game to which this bonus game and the bonus game itself are to be protected by the following claims. Throughout this disclosure the term choice has been used. The claims that follow seek to include with in the meaning of the term, "choice" selection, guess, pick, preference and the like and so the preferred interpretation of the claims must include all equivalents for the term choice. The claims that follow are to be construed so as to give broad coverage to the novel aspects of the claimed invention.

I claim:

1. A method of operating a gaming machine including a program, said method comprising:

(a) causing a display device to display a finite number of game objects to a player for a play of a game, each of the finite number of game objects having a probability of success and an associated award;

(b) causing the display device to display a player object to the player;

(c) enabling the player to choose one of the displayed game objects;

(d) causing a processor to execute said program to determine either a successful result or an unsuccessful result for the chosen game object, wherein said determination is based on the probability of success for the chosen game object;

(e) for each determination of the successful result for the chosen game object, awarding to the player the associated award for the chosen game object;

(f) for each determination of the unsuccessful result for the chosen game object, causing the processor to execute said program to separately and randomly determine if a game end result occurs for the displayed player object, wherein said separate and random determination is based on an end game probability which is greater than zero; and (g) when the game end result is determined to occur for the displayed player object, causing the processor to execute said program to end the play of the game; and (h) when the end game result is not determined to occur for the displayed player object:

(i) enabling the player to chose another one of the game objects for the play of the game, and (ii) causing the processor to execute said program to repeat (d) to (h) at least once.

2. The method of claim 1 further comprising:

when the end game result is not determined to occur for the displayed player object:

causing the processor to execute said program to remove the chosen game object from the finite number of game objects displayed;

enabling the player to choose another game object from the remaining number of displayed game objects; and causing the processor to execute said program to repeat (d) to (h) at least once.

3. The method of claim 1 wherein determining either the successful result or the unsuccessful result for the chosen game object further comprises:

causing the display device to display a firing at the chosen game object from the player object, wherein a displayed firing miss of the chosen game object is the determined unsuccessful result.

4. The method of claim 1 wherein causing the processor to execute said program to separately and randomly determine if the game end result occurs for the displayed player object further comprises:

causing the processor to execute said program to select one of the displayed game objects;

causing the display device to display a firing from the selected displayed game object at the player object, wherein a displayed firing miss of the player object is a continue game result;

enabling the player to choose another one of the displayed game objects in response to the continue game result; and causing the processor to execute said program to repeat (d) to (h) at least once.

5. The method of claim 1 wherein causing the processor to execute said program to separately and randomly determine if the game end result occurs for the player object further comprises:

causing the processor to execute said program to select one of the displayed game objects;

causing the display device to display a firing from the selected displayed game object at the player object, wherein a displayed firing miss of the player object is a continue game result; and in response to the continue game result:

causing the processor to execute said program to remove the chosen game object from the finite number of game objects displayed, enabling the player to choose another game object from the remaining number of displayed game objects and causing the processor to execute said program to repeat (d) to (h) at least once.

6. The method of claim 1 further comprising:

awarding a bonus award to the player when the end game result is not determined to occur for the displayed player object.

7. The method of claim 1 wherein multiplying the probability of success and the associated award together for each of the finite number of game objects results in an expected value that is constant for all game objects.

8. The method of claim 1 further comprising:

when the successful result is determined for the chosen game object:

causing the processor to execute said program to remove the chosen game object from the finite number of displayed game objects;

enabling the player to choose another game object from the remaining displayed game objects; and causing the processor to execute said program to repeat (d) to (h) at least once.

9. A method of operating a gaming machine including a program, said method comprising:

(a) causing a display device to display a number of game objects to a player for a play of a bonus game, each of the number of game objects having a probability of success and an associated award;

(b) causing the display device to display a player object to the player;

(c) enabling the player to chose one of the displayed number of game objects;

(d) causing a processor to execute said program to randomly determine either an successful result or an unsuccessful result for the chosen game object, wherein said determination is based on the probability of success for the chosen game object;

(e) for each determination of the success result for the chosen game object;

(i) awarding to the player the associated award for the chosen game object; and (ii) causing the processor to execute said program to remove the chosen game object;

(f) for each determination of the unsuccessful result for the chosen game object, causing the processor to execute said program to separately and randomly determine if a game end result occurs for the displayed player object, wherein said separate and random determination is based on an end game probability which is greater than zero;

(g) causing the processor to execute said program to end the play of the bonus game when the game end result is determined to occur for the player object; and (h) enabling the player to choose one of any remaining game objects and causing the processor to execute said program to repeat (d) to (h) at least once when the end game result is not determined to occur for the player object or when the successful result is determined for the chosen game object.

10. The method of claim 9 wherein causing the processor to execute said program to randomly determine either the successful result or the unsuccessful result for the chosen game object further comprises:

causing the display device to display a firing at the chosen game object from the player object, wherein a displayed firing miss of the chosen game object is the determined unsuccessful result.

11. The method of claim 9 wherein causing the processor to execute said program to separately and randomly determine if the game end result occurs for the player object further comprises:

causing the processor to execute said program to select one of the displayed gaming objects;

causing the display device to display a firing from the selected displayed game object at the player object, wherein a displayed firing miss of the player object is a continue game result; and in response to the continue game result:

enabling the player to choose another displayed game object, and causing the processor to execute said program to repeat (d) to (h) at least once.

12. The method of claim 9 wherein causing the processor to execute said program to separately and randomly determine if the game end result occurs for the player object further comprises:

causing the processor to execute said program to select one of the displayed gaming objects;

causing the display device to display a firing from the selected displayed game object at the player object, wherein a displayed firing miss of the player object is a continue game result; and in response to the continue game result:

causing the processor to execute said program to remove the chosen game object from the number of displayed game objects, enabling the player to choose another displayed game object from the remaining number of displayed game objects, and causing the processor to execute said program to repeat (d) to (h) at least once.

13. The method of claim 9 wherein multiplying the probability of success and the associated award together for each of the number of game objects results in an expected value that is constant for all game objects.

14. A method of operating a gaming machine including a program, said method comprising:

(a) causing a display device to display a number of game objects to a player for a play of a game, each of the number of game objects having a probability of success and an associated award wherein the probability of success when multiplied by the associated award is constant for all game objects;

(b) causing the display device to display a player object to the player;

(c) enabling the player to choose one of the displayed game objects;

(d) causing a processor to execute said program to determine either a successful result or an unsuccessful result for the chosen game object, said determination based on the probability of success for the chosen game object;

(e) for each determination of the unsuccessful result for the chosen game object, causing the processor to execute said program to separately and randomly determine if a game end result occurs for the displayed player object, wherein said separate and random determination is based on an end game probability which is greater than zero;

(f) when the game end result is determined to occur, causing the processor to execute said program to end the play of the game;

(g) when the game end result is not determined to occur for the chosen game object:

(i) enabling the player to chose another one of the game objects for the play of the game, and (ii) causing the processor to execute said program to repeat (d) to (g) at least once.

15. The method of claim 14 further comprising:

when the game end result is not determined to occur:

causing the processor to execute said program to remove the chosen game object from the number of game objects displayed, enabling the player to choose another game object from the remaining number of displayed game objects, and causing the processor to execute said program to repeat (d) to (g) at least once.

* * * * *